United States Patent [19]

Foeldi et al.

[11] Patent Number: 5,491,635
[45] Date of Patent: Feb. 13, 1996

[54] ARRANGEMENT AND A PROCESS FOR CONTROLLING A STARTING DEVICE OF A VEHICLE DRIVE

[75] Inventors: Tamás Foeldi, Enzersdorf, Austria; Heinz Stehle, Weissach, Germany; Udo Heim, Leonberg, Germany; Hai T. Xuan, Korntal-Muenchingen, Germany; Rainer Wuest, Wiernsheim, Germany

[73] Assignee: Dr. Ing. h.c.F. Poresche AG, Weissach, Germany

[21] Appl. No.: 288,060

[22] Filed: Aug. 10, 1994

[30] Foreign Application Priority Data

Aug. 10, 1993 [DE] Germany .................... 43 26 783.1
Dec. 16, 1993 [DE] Germany .................... 43 42 945.9

[51] Int. Cl.$^6$ .................................................. G06F 19/00
[52] U.S. Cl. ...................... 364/431.1; 477/176; 477/15; 477/20; 477/69; 364/424.1; 74/565; 74/733.1; 192/3.3
[58] Field of Search .................... 364/431.1, 431.09, 364/431.01, 424.1, 424.01; 192/3.55, 3.63, 103 R, 52, 3.31, 4 B, 3.3, 113.36, 3.23, 3.34, 70.12, 85 AA; 477/86, 99, 74, 41, 45, 126, 39, 62, 167, 126, 61, 44, 69, 176, 15, 20; 74/731.1, 565

[56] References Cited

U.S. PATENT DOCUMENTS

| | | | |
|---|---|---|---|
| 4,018,316 | 4/1977 | McQuinn et al. | 477/30 |
| 4,122,732 | 10/1978 | Chana | 477/69 |
| 4,730,520 | 3/1988 | Nishikawa et al. | 477/61 |
| 4,971,183 | 11/1990 | Tellert | 477/86 |
| 4,986,401 | 1/1991 | Petzold et al. | 477/176 |
| 5,010,989 | 4/1991 | Huntley | 477/39 |
| 5,014,832 | 5/1991 | Satoh et al. | 477/86 |
| 5,050,716 | 9/1991 | Christensen | 192/3.34 |
| 5,065,135 | 11/1991 | Leigh-Monstevens et al. | 477/99 |
| 5,176,234 | 1/1993 | Reik et al. | 192/52 |
| 5,395,293 | 3/1995 | Matsuura et al. | 477/15 |

FOREIGN PATENT DOCUMENTS

| | | |
|---|---|---|
| 0043661 | 1/1982 | European Pat. Off. . |
| 0130794 | 1/1985 | European Pat. Off. . |
| 3209645A1 | 9/1983 | Germany . |
| 3606229A1 | 9/1986 | Germany . |
| 2153035 | 8/1985 | United Kingdom . |

*Primary Examiner*—Kevin J. Teska
*Assistant Examiner*—Jacques H. Louis-Jacques
*Attorney, Agent, or Firm*—Evenson, McKeown, Edwards & Lenahan

[57] ABSTRACT

A starting operation for a vehicle is carried out in two phases, specifically in a first phase, the input rotational speed is led to a desired rotational speed, and in a following second phase, a rotational speed difference signal formed from the difference between the input rotational speed and the output rotational speed is led to the zero value according to a predetermined desired course. The first phase begins when the starting device is not completely closed and the position of the power control element is below a limit value. The desired rotational speed is first determined as a function of the position of the power control element, the time variation of the position, and a signal describing the driver's driving style. With the determined desired rotational speed, a desired curve of a control signal for an actuator of the starting device is then determined in such a manner that, in the case of the actual position of the power control element, this desired rotational speed is definitely reached. The second phase of the starting operation begins when the input rotational speed signal has approximately reached the desired rotational speed or when a predetermined driving speed is reached. A rotational speed difference signal, that is, the slip existing in the starting device, is led toward zero according to a desired curve. The thermal stress to the clutch is used for influencing the starting operation in that the desired rotational speed is determined as a function of this stress.

18 Claims, 4 Drawing Sheets

ARRANGEMENT AND A PROCESS FOR CONTROLLING A STARTING DEVICE OF A VEHICLE DRIVE

BACKGROUND AND SUMMARY OF THE INVENTION

The present invention relates to a process for controlling a starting of a motor vehicle drive that has a driving engine and a starting device, using the quantities: the position of a power control element of the driving engine; the input rotational speed of the starting device, and the output rotational speed of the starting device, with the starting operation being carried out in two phases.

Generally, starting devices are devices which, in the case of vehicle drives, permit a starting of the vehicle. These include, for example, the known types of rotational speed converters (input and output speed differ; input and output torque are identical), such as friction clutches, magnetic clutches and magnetic particle clutches as well as hydrodynamic (converter) clutches. In this case, vehicle drives are particularly those drives which supply a usable torque only starting at a rotational speed larger than zero and therefore cannot be started in a rigid coupling to the device to be driven. The range above this rotational speed is called the power range; the range below it is called the starting range or the starting gap.

From German Patent Document DE-32 09 645 A1, an arrangement has become known for controlling a motor vehicle drive unit, in which a control unit controls an actuating drive of a hydraulic clutch in such a manner that the torque at the clutch is proportional to a pilot control value and proportional to the square of the rotational engine speed. The pilot control value is obtained via a characteristic curve converter from the signal of an accelerator pedal generator. The signal of the rotational speed generator controls via a second characteristic curve converter at the same time the throttle valve and thus the engine torque of the motor vehicle drive unit.

Furthermore, from German Patent Document DE 36 06 229 A1, a device is known for automatically controlling the start of an engine-driven vehicle which is used for automatically engaging a friction clutch corresponding to the actuating of an accelerator pedal. For this purpose, the position of the accelerator pedal is sensed, and a first control device affecting the engine holds the rotational engine speed on a desired rotational speed which was determined as a function of the position of the accelerator pedal. A second control device affecting the clutch controls the slip of the clutch for a predetermined time period corresponding to characteristic data which are also selected as a function of the position of the accelerator pedal.

It is an object of the invention to provide an arrangement and a process for controlling a starting device which is improved, on the one hand, while taking into account the driver's wishes and, on the other hand, while taking into account the vehicle environment.

This and other objects are achieved by the present invention which provides a process for controlling a starting of a motor vehicle drive that has a driving engine and a starting device, and comprises the steps of using the quantities: position of a power control element of the driving engine; the input rotational speed of the starting device, and the output rotational speed of the starting device; and carrying out a starting operation in two phases. These phases include a first phase in which the input rotational speed is led to a desired rotational speed, and a subsequent second phase in which a rotational speed difference signal formed from the difference between the input rotational speed and the output rotational speed is led along a desired course to the zero value.

The objects are also achieved by another embodiment of the present invention which provides a control arrangement for a driving engine and a starting device connected behind it, comprising a first generator for outputting a position of a power control element of the driving engine, a second generator for outputting an input rotational speed signal of the starting device, and a third generator for outputting an output rotational speed signal of the starting device 2. A difference forming device is coupled to the second and third generators and determines a rotational speed difference signal as the difference between the input rotational speed signal and the output rotational speed signal. A first characteristic curve converter is coupled to the first generator for determining a desired rotational speed as a function of the signal of the first generator. A first control device is provided which, in a first phase of the starting operation, generates a difference actuating signal in such a manner that the input rotational speed signal is led to the desired rotational speed signal and in a second phase, generates the difference actuating signal in such a manner that the rotational speed difference signal changes at a rate which is a function of the size of the rotational speed difference signal. A second characteristic curve converter is coupled to the first generator for determining a first actuating signal as a function of the position of the power control element, the input rotational speed signal and the desired rotational speed. A second control device determines a second actuating signal from the first actuating signal and an application actuating signal. An actuating device acts upon the starting device according to the sum of the second actuating signal and the difference actuating signal.

It is particularly advantageous that the starting dynamics and the agility are improved by the present invention without any cutbacks with respect to the parking comfort. At the same time, the starting device is treated with better care, is protected from misuse by means of overloading and is securely saved from destruction. For this purpose, the starting operation is carried out in two phases, specifically in a first phase in which the rotational input speed is led to a desired rotational speed and, in a second subsequent phase, in which a rotational speed difference signal formed from the difference between the rotational input speed and the rotational output speed is caused to follow a predetermined desired course to the zero value. As a result of the invention, the starting behavior is a function of changes of the conditions at the starting device which may occur, for example, as the result of stress and wear.

It is suggested to let the first phase begin when the starting device is not completely closed and the position of the power control element is below a limit value. As a result, each starting operation will be recognized irrespective of whether it is a start from a stopped condition or a restart after a deceleration condition that is not quite a stoppage. Within the first phase and as a function of the position of the power control element, of the time variation of the position of the power control element and a signal describing the driver's driving style, the desired rotational speed is determined first and is therefore adapted to the driver's driving style or his driving wish. While the driving style is sensed for an extended period of time and therefore, during the first start, after the start-up of the vehicle, is still at its basic value, the starting operation can clearly be influenced by the power control element, in which case, in addition to the absolute position, the speed is also taken into account at which the power control element was brought to it. Subsequently, by means of the thus determined desired rotational speed, a desired curve of a control signal for an actuator of the starting device is determined in such a manner that in the actual position of the power control element, this desired rotational speed will definitely be reached. Thus, it is taken into account that, based on the rotational idling speed, not every desired rotational speed can be reached along the same path, that is, along the same characteristic curve. Finally, and this is where the actual starting operation begins, via the characteristic curve and as a function of the position of the power control element and the input rotational speed signal, the actuating device is controlled by the control signal in such a manner that the input rotational speed signal approaches the desired rotational speed.

For the second phase of the starting operation, this second phase begins when the input rotational speed signal has almost reached the desired rotational speed. In order to also take cases into account in which acceleration takes place only slowly and at a constant power, it is also provided to begin the second phase in every case when a predetermined driving speed is reached. In the second phase, a rotational speed difference signal—that is, the slip existing in the starting device, is led toward zero according to a desired curve. The speed at which the rotational speed difference signal is changed according to this desired curve is, in turn, a function of the rotational speed difference signal and becomes continuously lower the lower the rotational speed difference signal. Because of the desired curve, which operates by the return of the rotational speed difference signal in a closed control circuit, this second phase is not affected by outside influences, such as temperature and wear. The course of the desired curve and therefore the starting comfort can be adjusted within wide ranges. As a result of the suggested course of the desired curve, a very comfortable engaging of the clutch, for example, is possible because in the proximity of the clutch engaging point the input and the output rotational speed signals are caused to approach one another more and more slowly and therefore without any jerking. This transition between an almost closed and a completely closed starting device therefore takes place without any disturbing jerky transitions.

The observation of the thermal stress to the clutch is necessary in order to be able to recognize a threatening thermal destruction in time. For this purpose, it is suggested that a stress value be determined which represents the utilization of the stressing capacity of the starting device utilized up to then and by means of which the starting operation can be influenced. In the event of stress, the stress value is determined by calculating the frictional output occurring in the clutch, and in the case of a reduction of stress, it is determined by means of a cooling function. According to the present invention, the starting operation is carried out as a function of the utilization of the stressing capacity of the starting device and a sudden reaching or exceeding of the stressing limit is therefore avoided. The influencing of the starting operation takes place in a particularly simple manner by a determination of the desired rotational speed which is a function of the stress value, particularly by a lowering of the desired rotational speed with a rising stress value.

Certain embodiments of the invention provide measures which are used under special circumstances independently or in addition to the above-described measures in order to improve the overall operation of the starting device under any conceivable conditions. Thus, in a case in which the stress limit of the starting device could be reached or even exceeded, it is provided that the driver be informed of it, in which event, in addition to the exceeding of the stress limit, the amount of the still remaining stress reserve is indicated beforehand. Furthermore, measures are provided by means of which the start of a coasting of the vehicle is improved when the starting device must be opened up because the stress limit is reached. As a result, the driver will prevent unexpected reactions of the vehicle.

In order to minimize the influence of wear, temperature, aging, etc. of the starting device as well as the influence of the actuator acting upon the starting device on the starting operation, measures are indicated for determining a system actuating signal. This system actuating system is always determined again in such a manner that, when the actuator is acted upon by this signal, the starting device is operated close to the engaging or slip point so that, with a further increase of the signal, the starting device begins to grip immediately. In this case, the indicated process for determining the system actuating signal is distinguished by a particularly rugged method of operation under all operating conditions.

Furthermore, in certain embodiments, to securely open up the starting device under certain conditions, for example, when the vehicle is stopped, the actuating signal is reduced by a predetermined amount in order to thus minimize the stressing of the starting device and to prevent a crawling of the vehicle.

In addition, in certain embodiments under certain conditions, for example, after the stoppage of a vehicle or after a preceding (negative) control pulse, a (positive) control pulse is emitted by means of which empty runs existing in the starting device are overcome and therefore the system actuating signal is reached again as fast as possible in the actuator in order to again initiate a gripping of the starting device as soon as possible and to be able to react faster to a starting command of the driver.

By means of the automatic closing of the starting device when the vehicle starts to roll without any power demand, as for example, on a gradient, the braking effect of the engine is maintained.

Finally, certain embodiments of the invention provide measures by which the efficiency of the engine is utilized to the largest possible extent for the acceleration of the vehicle. It is particularly advantageous in this case that these measures are taken only in response to a special demand signal and that therefore an unintentional use and misuse can be prevented.

Other objects, advantages and novel features of the present invention will become apparent from the following detailed description of the invention when considered in conjunction with the accompanying drawings.

DETAILED DESCRIPTION OF THE DRAWINGS

Here and in the following, the terms AND/OR apply to the operations of the same name in Boolean algebra.

Figure 1:
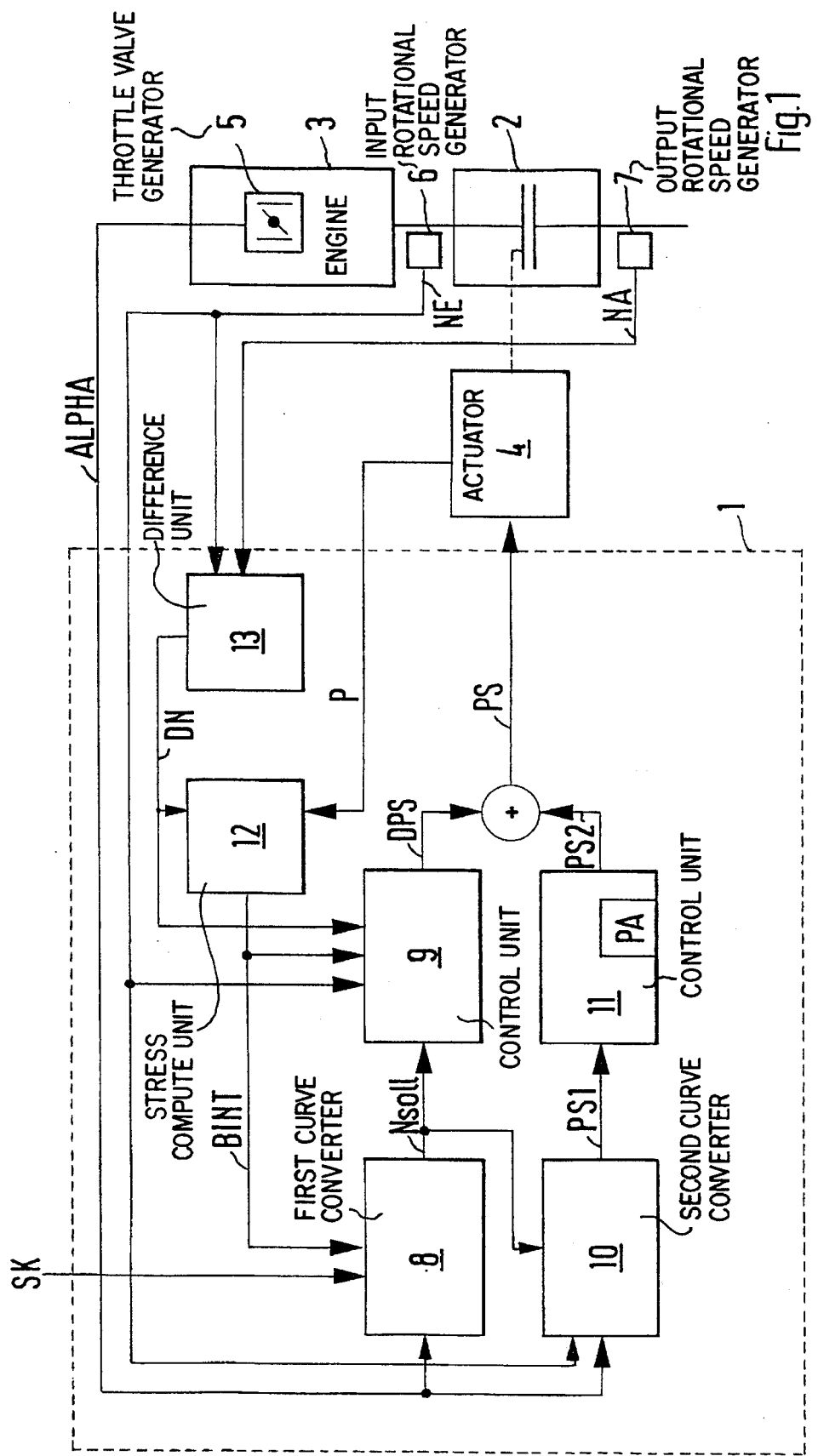
FIG. 1 is an overview of a control arrangement according to an embodiment of the invention which acts upon a vehicle output unit.

FIG. 1 illustrates a control arrangement 1 of a starting device constructed as a friction clutch 2 of a driving engine 3 of a vehicle which is not shown, which control arrangement 1 acts upon an actuator 4 connected with the clutch 2. The actuator 4 actuates the clutch 2 so that this clutch 2 transmits a power flux from the driving engine 3 between 0% (completely opened up) and 100% (completely closed), and therefore acts as a starting device. A throttle valve generator 5 arranged on the driving engine 3 supplies a throttle valve signal ALPHA to the control arrangement 1. An input rotational speed generator 6, which supplies an input rotational speed signal NE, and an output rotational speed generator 7, which supplies an output rotational speed NA, are arranged on the clutch 2. The actuator 4 receives a desired pressure signal PS as an input signal from the control arrangement 1 and emits a pressure signal P to the control arrangement 1 which represents the pressure exercised on the clutch 2 and therefore the torque transmitted by the clutch 2. In the illustrated embodiment, the pressure signal P is the input signal of the actuator 4 and is therefore identical to the desired pressure signal PS. If the expenditures required for this purpose are reasonable, the pressure signal P is also actually determined by a pressure generator on the clutch 2 or by similar devices in other embodiments.

The control arrangement 1 comprises a first characteristic curve converter 8, a control device 9, a second characteristic curve converter 10, a control device 11, a stress computing unit 12 as well as a difference forming device 13. As a function of the throttle valve signal ALPHA, its time derivation dALPHA/dt as well as a driving activity SK of the driver, the first characteristic curve converter 8 determines a desired rotational speed Nsoll. The desired rotational speed Nsoll is transmitted to the control device 9 and to the second characteristic curve converter 10.

From the throttle valve signal ALPHA, the desired rotational speed Nsoll and the input rotational speed signal NE, the second characteristic curve converter 10 determines a first desired pressure signal PS1 which is transmitted to the control device 11 as a first actuating signal. This control device 11 will then modify the first desired pressure signal PS1 by additional quantities and thus forms a second desired pressure signal PS2.

The control device 9 determines a desired pressure difference signal DPS by means of the input rotational speed signal NE, by means of a rotational speed difference signal DN formed from the input rotational speed signal NE and the output rotational speed signal NA by means of a difference forming device 13 as well as, as mentioned above, by means of the desired rotational speed Nsoll. The desired pressure signal PS formed as a summation signal from the second desired pressure signal PS2 as well as the desired pressure difference signal DPS, is emitted to the actuator 4 which acts upon the clutch 2 according to the desired pressure signal PS. The stress computing unit 12 receives the rotational speed difference signal DN and the pressure signal P and from them determines the stress value BINT which is transmitted to the first characteristic curve converter 8 and the control device 9.

Figure 2:
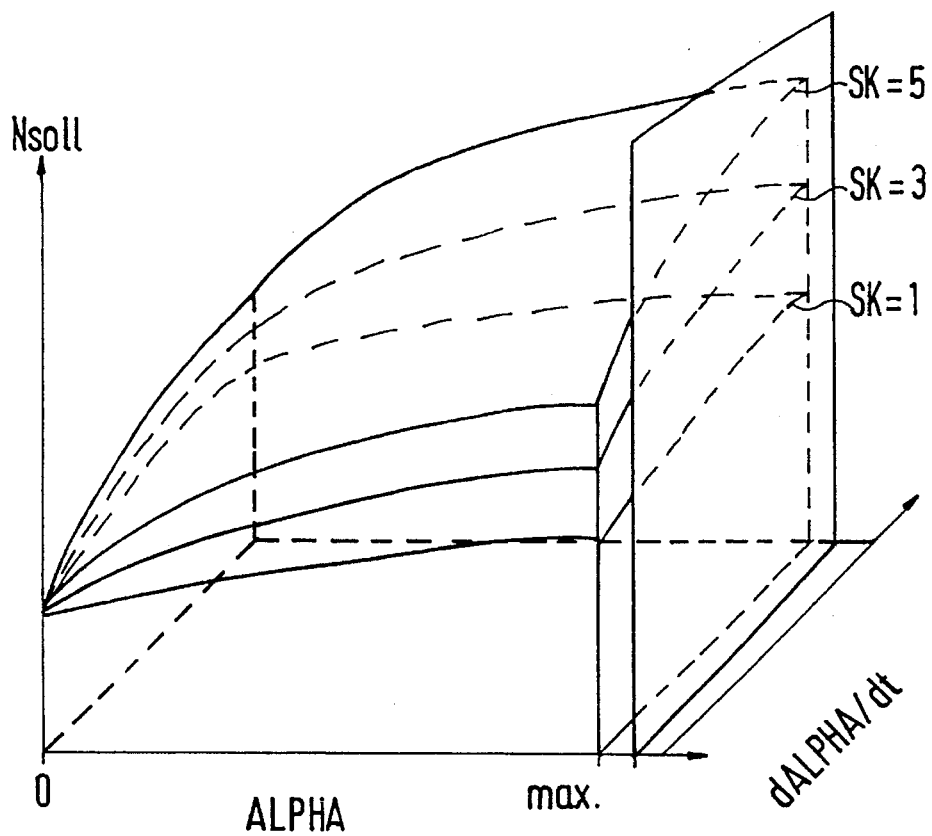
FIG. 2 is a view of a three-dimensional characteristic diagram of a desired rotational speed comprising a throttle valve signal, the time variation of this signal as well as its driving activity which is provided in a first characteristic curve converter.

The first characteristic curve converter 8 determines the desired rotational speed Nsoll using a three-dimensional characteristic diagram qualitatively illustrated in FIG. 2 from the throttle valve signal ALPHA, the time variation dALPHA/dt of this signal, that is, of the throttle valve speed, as well as the driving activity SK which, in the manner known to those of ordinary skill in the art from German Patent Document DE 39 22 051 A1, describes a driving style of the driver or his action caused by the traffic situation. The desired rotational speed Nsoll rises with a rising throttle valve signal ALPHA and with a rising throttle valve speed dALPHA/dt. At a driving activity SK=1, which corresponds more to a comfort-oriented driving method, the rise in the desired rotational speed Nsoll is minor and, at a driving activity SK=5, which corresponds to a sporty driving method, the rise is very large. The highest rotational speed Nsoll is therefore reached at a maximal throttle valve signal ALPHA, a maximal throttle valve speed dALPHA/dt and a sporty driving method.

A kick-down range, which is reached by the overcoming of a resistance at the stop of the throttle valve, adjoins the above-described range. In this case, the throttle valve signal ALPHA keeps its maximal value in an unchanged manner. This range resembles the known kick-down function of an automatic transmission; only one characteristic curve is still provided in this range which is independent of the driving activity SK, is situated above the characteristic curve for the sporty driving method and extends more flatly than the latter. Even when the throttle valve speed dALPHA/dt is low, high desired rotational speeds Nsoll are reached in the kick-down range so that, in each case, a power-oriented special start is possible irrespective of the recognized driving style and largely independently of the throttle valve speed dALPHA/dt.

The second characteristic curve converter 10 comprises a characteristic diagram of the first desired pressure signal PS1 above the input rotational speed signal NE, (FIG. 3), which is formed of a characteristic engine diagram representing the engine torque above the rotational engine speed. Curves of the first desired pressure signal PS1 are entered for a constant throttle valve signal ALPHA as a function of the input rotational speed signal NE which correspond to the course of the engine torque above the rotational engine speed for a predetermined throttle valve adjustment. Furthermore, characteristic curve B is entered which represents a desired course of the first desired pressure signal PS1 as a function of the input rotational speed signal NE. In the illustrated example, characteristic curve B rises exponentially with the increasing input rotational speed signal NE.

Comparable to a pilot control and a fine control, the characteristic curve B is first adapted as a function of the throttle valve speed dALPHA/dt (pilot control) and is subsequently displaced by an offset value DNE (fine control) in order to thus reach the predetermined desired rotational speed Nsoll as precisely as possible.

Figure 3:
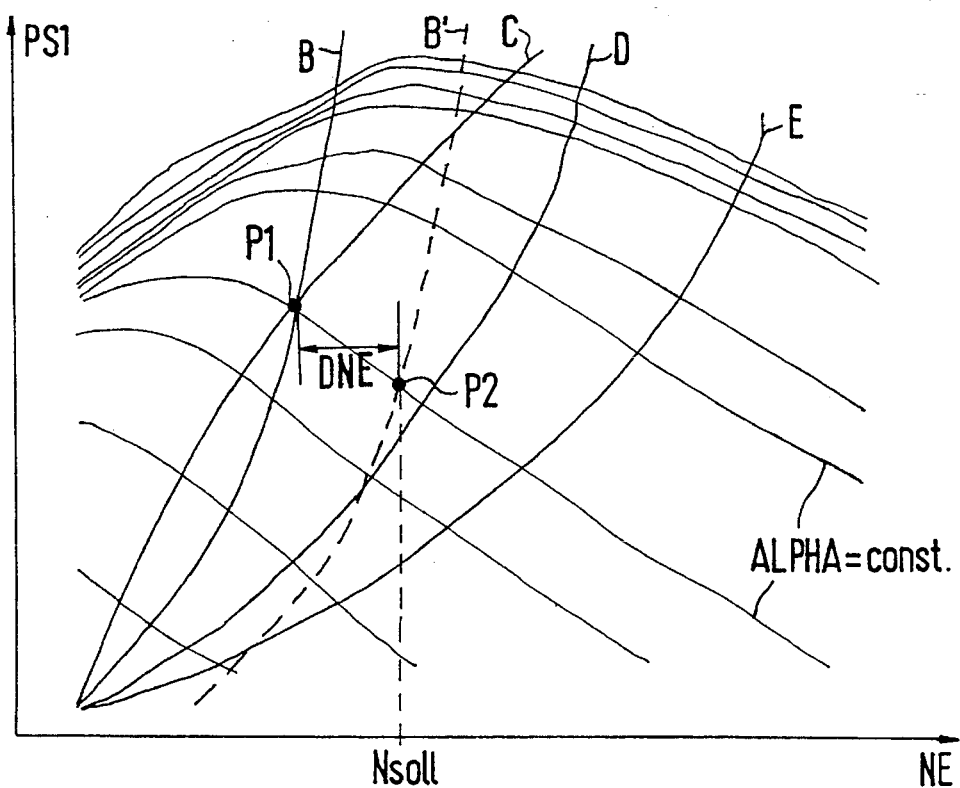
FIG. 3 is a view of a characteristic diagram of a desired pressure signal as a function of an input rotational speed signal which is provided in a second characteristic curve converter.

In the illustrated example, the characteristic curve B is rotated about its origin as a function of the throttle valve speed dALPHA/dt, as shown in FIG. 3 by characteristic curves D and E. As the throttle valve speed dALPHA/dt rises, the input rotational speed NE also rises which is reached in the case of the predetermined throttle valve signal ALPHA.

So that, for the predetermined throttle valve signal ALPHA, the input rotational speed NE reaches the desired rotational speed Nsoll, the offset value DNE is added to the input quantity input rotational speed signal NE so that the desired pressure signal will now be determined for the sum of the input rotational speed signal NE and the offset value DNE:

$$PS1=f(ALPHA, NE+DNE)$$

The offset value DNE is determined in that the second characteristic curve converter 10 first determines the input rotational speed signal NE which would occur according to characteristic curve B at the applied throttle valve signal ALPHA (see Point P1 in FIG. 3) and subsequently forms the difference to the desired rotational speed Nsoll (see Point P2 in FIG. 3) determined in the first characteristic curve converter 8. In the illustrated characteristic diagram, this has the effect of a displacement of the characteristic curve B with respect to a characteristic curve B' which now at point P2 of the desired rotational speed Nsoll to be adjusted intersects the characteristic curve of the first desired pressure signal PS1 for the applied throttle valve signal ALPHA.

The illustrated shape of characteristic curve B is an example of a general characteristic starting curve which can be adapted to the requirements in multiple manners. When, by means of the driving activity SK, a comfort-oriented or consumption-oriented driving method is recognized, a consumption-optimal characteristic curve C may be used, corresponding to a curve in the characteristic engine diagram, which connects the points of minimal consumption with one another. Also, the driving activity SK may be used instead of the throttle valve speed dALPHA/dt for changing the characteristic curve B. In the illustrated example, the characteristic curve B would correspond to a driving activity SK=1, corresponding to a comfortable driving method; the characteristic curve D would correspond to a driving activity SK=3, corresponding to a normal driving method; and characteristic curve E would correspond to a driving activity SK=5, corresponding to a sporty driving method.

From the first desired pressure signal PS1 generated in the second characteristic curve converter 10 and at least one stored applied pressure PA, the control device 11 determines a second desired pressure signal PS2. The applied pressure PA corresponds to the applied actuating signal for the actuator 4 which represents the second desired pressure signal PS2 which is required for holding clutch disks arranged in the clutch 2 at the point at which there is just barely no torque transmission or crawling torque yet.

The actuator 4 receives the desired pressure signal PS which, as the summation signal, contains the first desired pressure signal PS1 which is modified by the applied pressure PA by the control device 11 with the second desired pressure signal PS2 as well as the desired pressure difference signal DPS determined by the control device 9. In this case, the applied pressure PA may be understood to be a system-dependent basic value; the first desired pressure signal PS1 may be understood to be a pilot control value; and the desired pressure difference signal DPS may be understood to be a fine-control value or control proportion which in the summation then form the actual actuating signal for the actuator 4.

The control device 9 comprises two control algorithms. In the first phase of the starting operation, the desired rotational speed Nsoll determined by the first characteristic curve converter 8 forms the command variable which the input rotational speed signal NE follows. The actuating variable is the desired pressure difference signal DPS which, in addition to the second desired pressure signal PS2, is supplied to the actuator 4. This first phase starts when the throttle valve signal ALPHA exceeds a limit value, the clutch 2 is not completely closed, and a starting ratio (forward or reverse) is selected in a transmission of the vehicle connected behind the clutch 2. It ends when the input rotational speed signal NE has approximately reached the desired rotational speed Nsoll. In the present example, the desired rotational speed Nsoll is considered as being reached when the input rotational speed signal NE has reached at least 97% of the desired rotational speed Nsoll. If the driver accelerates only slowly and the throttle valve signal ALPHA is almost constant, the first phase will also be considered as being terminated if, in the case of an approximately constant throttle valve signal ALPHA, a predetermined driving speed of approximately 5 km/h is reached.

In the subsequent second phase, an internally generated desired change of the rotational speed difference signal dDNsoll will form the command variable according to which the change follows of the rotational speed difference signal DN supplied by the difference forming device 13. The desired change of the rotational speed difference signal dDNsoll is determined by means of a characteristic curve illustrated in FIG. 4 from the rotational speed difference signal DN. This function of the desired change of the rotational speed difference signal dDNsoll illustrated in FIG. 4, as a function of the rotational speed difference signal DN, generates in the case of a high rotational speed difference signal DN, that is, at a high slip, a large desired change of the rotational speed difference signal dDNsoll which will then decrease when the rotational speed difference signal DN falls; however, at the zero value of the rotational speed difference signal DN still has a value, even though it is very low. In this second phase, the control device 9 has the effect that the rotational speed difference signal DN is guided toward zero according to a function predetermined by the characteristic curve. The second phase ends when the clutch 2 is completely engaged and the rotational speed difference signal DN has therefore fallen to zero. In the present example, this is considered as being achieved when the rotational speed difference signal DN falls below the 3% value.

With the complete engaging of the clutch 2, the starting operation is concluded and the control device 9 will now emit a second desired pressure signal PS2 to the actuator 4 and therefore has a third control algorithm which is not shown in detail. This second desired pressure signal PS2 is selected from a table as a function of the operating point of the driving engine 3. Generally, in this so-called power range, the second desired pressure signal PS2 will be so high that the clutch 2 can reliably transmit the torque that is supplied by the driving engine 3, but is not significantly higher.

In addition to the above-described control algorithms, the control device 9 also comprises monitoring functions which result in a stoppage of the existing condition. At least the following conditions are monitored:

When, during the second phase of the starting operation or in the power range in a starting gear or in the reverse gear below a speed threshold (in this case, 30 km/h), a sudden power demand is recognized, a stoppage is immediately initiated, and the first phase of the starting operation is initiated again. In this case, a sudden power demand is recognized when the throttle valve signal ALPHA is increased by a median amount (in this case, 30% of the final value) within a short time period (in this case, within 0.5 seconds) and, after the increase, takes on a high value (in this case, 50% of the final value). Sudden changes of the desired pressure signal PS2 caused by the stoppage may be reduced by filter functions.

When, during the second phase of the starting operation, a coasting operation occurs, the second phase is terminated above a driving speed of approximately 5 km/h; the clutch is therefore engaged completely, and the power range will start. When, in addition to the coasting, the operating of a service brake of the vehicle is also recognized, in contrast, the clutch 2 is opened immediately and subsequently, the first phase of the starting operation is initiated again as soon as the brake is no longer operated and the requirements for the initiating of the first phase are met again.

When, in the power range, the input rotational speed signal falls below a predetermined value NEmin, in which case this value is preferably selected in the range of an idling rotational speed value of the driving engine 3, the clutch 2 is opened up and subsequently the first phase of the starting operation is initiated again as soon as the requirements for the initiating of the first phase are met again.

The stress value BINT determined by the stress computing unit 12 is a measurement of the momentary thermal stress to the clutch 2. The method of the determination of the stress value BINT is a function of the extent of the rotational speed difference signal DN. When the rotational speed difference signal DN is above a value which corresponds to a rotational speed difference of approximately 20 revolutions per minute, the stress value BINT is determined in that the rotational speed difference signal DN, multiplied with the difference between the pressure signal P and the applied pressure PA, is added up or integrated. Otherwise, it is assumed that the clutch 2 is closed and the stress value BINT is reduced. The value by which the stress value BINT is reduced per time unit had previously been determined in tests and represents a clutch cooling function. Instead of a linear cooling function, an approximate calculation of the real cooling power can be used from other operating parameters of the vehicle, such as the input rotational speed signal NE, the driving speed or the transmitted torque. The reduction of the stress value BINT is carried out only until the stress value BINT has reached the zero value.

The stress value BINT affects the first characteristic curve converter 8 in that the desired rotational speed Nsoll is reduced while the stress value BINT rises. In the embodiment, this reduction does not take place linearly with the stress value but exponentially: While in the case of small stress values BINT up to approximately half of a maximal stress value BINTmax, the desired rotational speed Nsoll is hardly reduced, subsequently, the influence of the stress value BINT and therefore the reduction of the desired rotational speed Nsoll will rise more and more. Via the desired rotational speed Nsoll, the stress value BINT also acts upon the second characteristic curve converter 10 and, in the first phase, upon the control device 9. In the second phase, the control device 9 operates independently of the desired rotational speed Nsoll. In this case, the stress value BINT now acts upon the control device 9 in that the relationship between the rotational speed difference signal DN and the desired change of the rotational speed difference dDNsoll is changed in the sense of a faster closing of the clutch 2. This functional relationship is also exponential, as in the case of the first characteristic curve converter 8.

The above-described control arrangement 1 operates as follows:

The control arrangement 1 and, in it, particularly the control device 9 initiates the first phase of the starting operation when the throttle valve signal ALPHA sensed by the throttle valve generator 5 exceeds a limit value, the clutch 2 is not completely closed and a starting ratio (forward or reverse) is selected in a transmission of the vehicle connected behind the clutch 2. In this case, it is unimportant whether these conditions are achieved because of a start from a stoppage or by a deceleration of the vehicle until the opening of the clutch 2. The power requirement is sensed as a throttle valve signal ALPHA by the throttle valve generator 5 and is transmitted to the first characteristic curve converter 8 and the second characteristic curve converter 10. It is the object of the first phase of the starting operation to lead the rotational speed input signal NE and thus the rotational speed of the driving machine 3 to a desired rotational speed value Nsoll.

First, the first characteristic curve converter 8 determines the desired rotational engine speed value Nsoll from the throttle valve signal ALPHA, the time variation of the throttle valve signal dALPHA/dt as well as the driving activity SK. This desired rotational engine speed value Nsoll is supplied as an input signal to the control device 9 connected behind. Corresponding to the power demand, the rotational speed of the driving engine 3 will increase and correspondingly the rotational input speed signal NE which is also supplied to the control device 9. On the basis of the control algorithm stored in it for the first phase of the starting operation, the control device 9 will now determine the desired pressure difference signal DPS from the desired rotational engine speed value Nsoll and the input rotational speed signal NE.

As described above, the second characteristic curve converter 10 determines the first desired pressure signal PS1 as a function of the input rotational speed signal NE. This first desired pressure signal PS1 is then increased in the control device 11 by the stored applied pressure PA. The thus formed second desired pressure signal PS2 and the desired pressure difference signal DPS are added up and emitted to the actuator 4 which then actuates the clutch 2. As an acknowledgement, the actuator 4 emits the pressure signal P to the control arrangement 1. Thus, on the whole, a pilot control is obtained by means of the second characteristic curve converter 10 which adjusts the first desired pressure signal PS1 as a function of the input rotational speed signal NE in such a manner that the desired rotational engine speed value Nsoll is essentially reached; a basic control which, by means of the control device 11, takes into account changes in the clutch 2 by the adding of the applied pressure PA; and a fine control by means of the control device 9 which influences the dynamics by means of the desired pressure difference signal DPS and provides that the desired rotational engine speed value Nsoll can be achieved in a precise manner.

Independently of and in parallel to the above-described operations, beginning with the start of the vehicle, the stress computing unit 12 continuously determines from the rotational speed difference signal DN and the pressure signal P, the stress value BINT and emits it to the characteristic curve converter 10. Thus, the stress value BINT is a measurement for the thermal stress to the clutch at any point in time. In the case of a first-time starting after an extended stoppage, the stress value BINT is zero, corresponding to a cold clutch 2. Therefore, after an extended stoppage of the vehicle, the stress value BINT first has no influence on the starting operation. This also applies to a clutch 2 subjected to minor stress. It is only at higher stress values above approximately 50% of the thermal stressing capacity of the clutch 2 that the influence of the stress value BINT starts to become noticeable. In the following, this influence is at first not taken into account and will be described later in a separate manner.

Figures 5A, 5B:
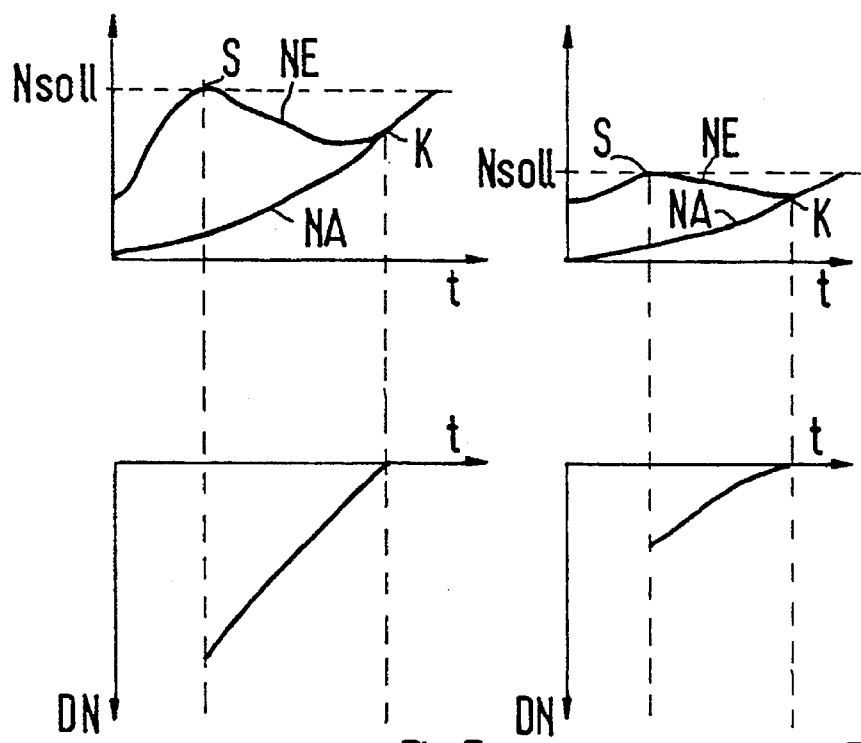
FIGS. 5a and 5b are views of courses of the input rotational speed signal over time for two starting operations.

In the starting operations illustrated as examples in FIGS. 5a and 5b, the input rotational speed signal NE has essentially reached the desired rotational engine speed value Nsoll at point S and closed the clutch 2 to such an extent that the rotational speed of the driving engine 3 is not increased further (approximately horizontal tangent at Point S). It should be stressed that the driving engine 3 is influenced only by the power control element, that is, by its throttle valve and thus by the throttle valve signal ALPHA, and is therefore influenced by the driver. The control arrangement 1 acts upon the driving engine 3 only via the clutch 2. The operating point of the driving engine 3 reached a point S is therefore set directly by the driver and the power control element, whereas the control device 1 adjusts to this operating point corresponding to the characteristic curve converters 8, 10.

The control strategy used in the control device 9 will change at point S, and in the manner described above, and the desired rotational speed Nsoll used in the first phase as a command variable will now be replaced by the desired change of the rotational speed difference signal dDNsoll. The object of this second phase, which is also called a slip control, is to lead the slip in clutch 2 represented by the rotational speed difference signal DN toward zero according to a predetermined function (FIG. 4) and thus close the clutch 2 completely. As a result, in the case of a sporty starting, the acceleration operation is carried out with high dynamics, that is, with a strong acceleration, and in the case of a normal starting or parking, a high comfort will occur because of a smooth starting and accelerating. For both cases, it is ensured that the final engaging in the clutch point K takes place in a smooth manner and is free of jerking.

Figure 4:
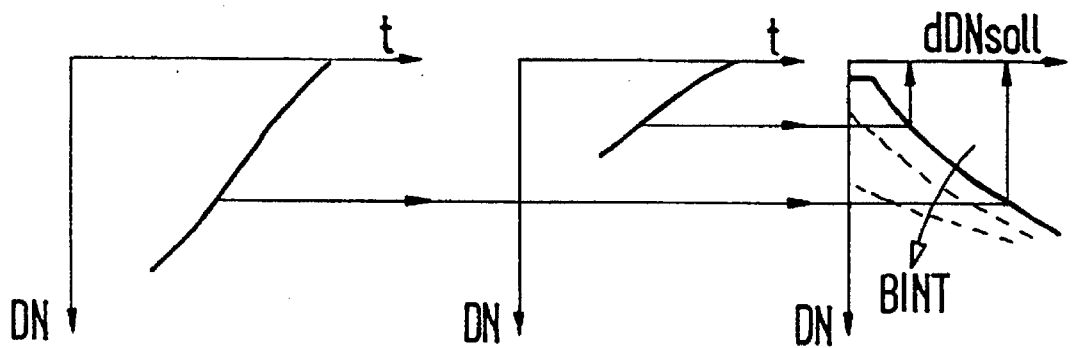
FIG. 4 is a view of a characteristic diagram of a desired change of a rotational speed difference signal as a function of the rotational speed difference signal used in a control device for determining a command variable, as well as courses of the rotational speed difference signal over the time for two starting operations.

FIG. 4 and FIGS. 5a and 5b show two starting operations (one sporty (FIG. 5a) and one comfort-oriented (FIG. 5b) starting operation side-by-side for comparison purposes. The two diagrams in FIGS. 5a and 5b show the course of the input rotational speed signal NE as well as of the output rotational speed signal NA over the time t. The two corresponding diagrams in FIG. 4 show the course of the rotational speed difference signal DN during the second phase of the starting operation above the time.

During a sporty start, the desired rotational engine speed value will be high because of the high throttle valve signal ALPHA and the high changing speed of the throttle valve signal ALPHA. At point S, the input rotational speed signal NE has almost reached the desired rotational engine speed signal and, in the following in the second phase, the control device 9 will operate according to the above-explained slip control. At this point in time, thus at the beginning of the slip control, during a sporty starting, the rotational speed difference signal DN is very high because the driving engine 3 has reached the desired rotational engine speed value Nsoll in a speedy manner and the vehicle could hardly be accelerated during this time (low output rotational speed signal NA). The control device 9 will then increase the desired pressure difference signal DPS in a speedy manner because, as illustrated in FIG. 4, at a high rotational speed difference signal DN, the desired change of the rotational speed difference signal dDNsoll is also high. For the driver, this becomes clear in the form of the falling input rotational speed signal NE and he can increase the power output of the driving engine 3 if the second characteristic curve converter 8 and the control device 11 are unable to hold the input rotational speed signal NE in the proximity of the desired rotational engine speed value. As the starting operation progresses, the rotational speed difference signal DN becomes lower and lower and therefore the desired changing speed of the rotational speed difference signal dDN will also decrease. At clutch point K, the desired changing speed dDNsoll is very low so that the complete engaging of the clutch 2 can take place in a smooth manner. The sporty starting operation is therefore distinguished by high dynamics and a strong acceleration.

The extreme case of a comfortable starting is the parking in which the driver operates the power control element only little and slowly. The desired rotational engine speed value Nsoll is now slightly above the rotational idling speed. Therefore, at the beginning of the slip control, the rotational speed difference signal DN and the desired change of the rotational speed difference signal dDNsoll are small and the desired changing speed of the rotational speed difference signal is very low. The drop of the input rotational speed signal NE is now hardly noticeable because the second characteristic curve converter 8 and the control device 11 can hold the input rotational speed signal NE in the proximity of the desired rotational engine speed signal so that an increase of the power demand is no longer necessary and the vehicle can be moved with a slipping clutch 2 and at a lower driving speed. It is only when a driving speed of approximately 5 km/h is exceeded, that the control device 9 initiates the second phase in the above-described manner and closes the clutch 2.

In the following, the effects are described of the stress value BINT on the starting operation. By means of the stress value BINT, the starting operation is not changed qualitatively but only quantitatively. It is a basic fact that, with a rising stress value BINT, the further stressing of the clutch 2 is to be reduced. This takes place in that the stress value BINT is to affect the desired rotational speed value Nsoll as well as optionally the characteristic curve of the desired change of the rotational speed difference signal dDNsoll. The effect is progressive so that, in the range below approximately 50% of the thermal stressing capacity of the clutch 2, it is hardly noticeable to the driver and, above approximately 50% of the thermal stressing capacity, will then be noticeable in a rapidly increasing manner.

As the stress value BINT rises, the desired rotational speed value Nsoll is reduced, and at the beginning of the second phase, the rotational speed difference signal DN is lower than when the clutch 2 is unstressed. In the second phase, the characteristic curve illustrated in FIG. 4 is displaced in the direction of larger desired changes of the rotational speed difference signal dDNsoll. In the exemplary embodiment, this takes place in that the desired change of the rotational speed difference signal DNsoll is multiplied by a factor which is in a functional relationship with the stress value BINT. As a result of these measures, the stress to the clutch 2 will essentially rise less because of the reduction of the slip in the clutch 2 as well as the reduction of the slip time.

With the complete engagement of the clutch 2, the starting operation is concluded, and the control arrangement 1 will now emit a second desired pressure signal PS2 to the actuator 4 which is determined by another algorithm provided in the control device 9 and which is selected from a table as a function of the operating point of the driving engine 3. Generally, in this so-called power range, the second desired pressure signal PS2 will be so high that the clutch 2 can reliably transmit the torque supplied by the driving engine 3, but not significantly higher.

Figure 6:
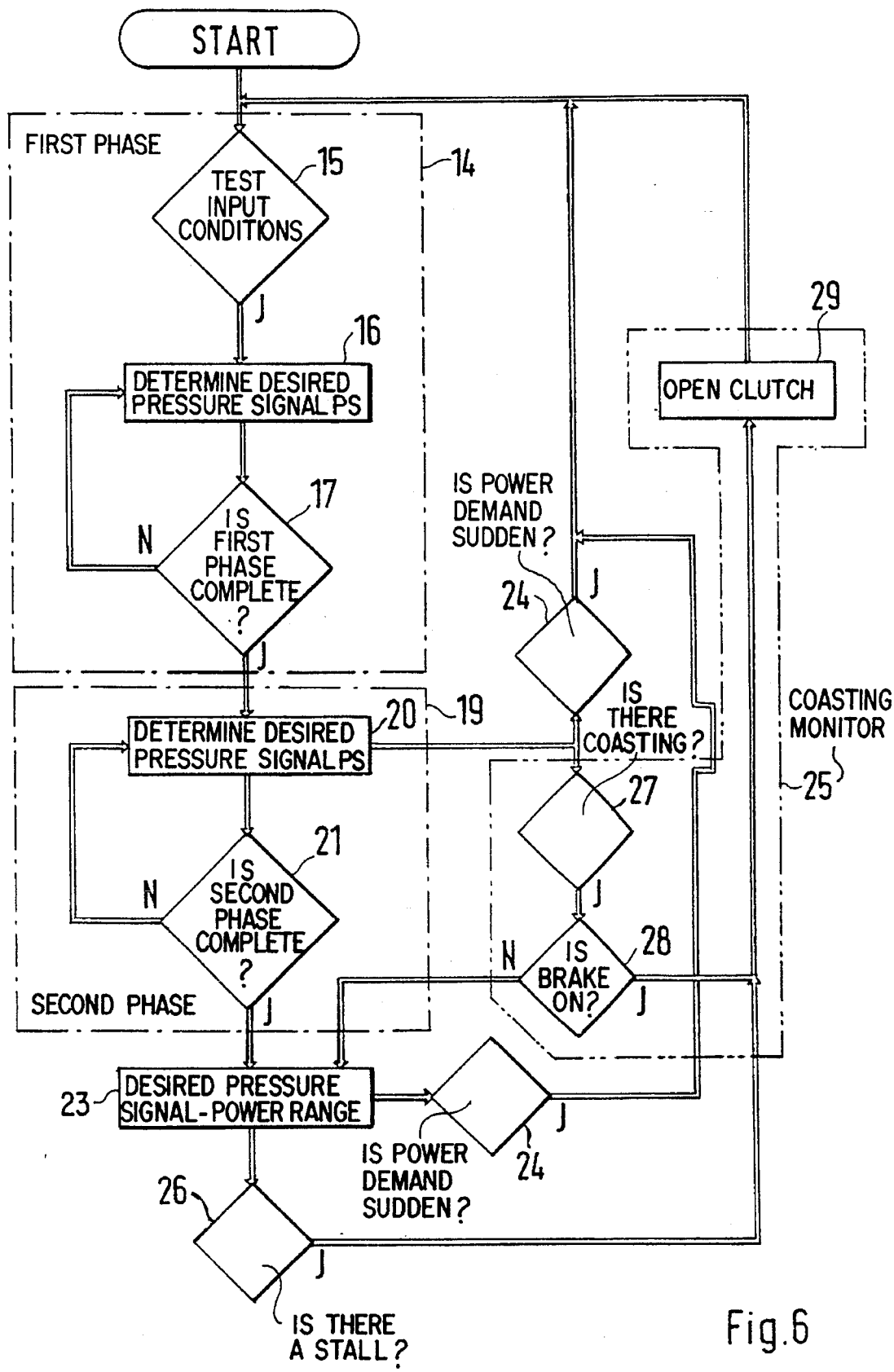
FIG. 6 is a view of the sequence of a starting operation in a diagrammatic flow chart.

Summarizing, FIG. 6 shows in a diagrammatic flow chart the sequence of a starting operation. In addition, the above-described monitoring functions of the control device 9 are entered in FIG. 6. The first phase with the reference number 14 consists of a first step 15 for testing the input conditions for the first phase 14; a second step 16 in which the desired pressure signal PS is determined by the control arrangement 1; and a final step 17 by means of which the end of the first phase 14 is determined.

The input conditions tested in step 15 are as follows:
the throttle valve signal ALPHA exceeds a limit value AND
the clutch 2 is not completely closed, that is, the rotational speed difference signal DN is unequal to 0 And
a starting ratio is selected in the transmission.

In step 16, the desired pressure signal PS is determined as the summation signal from the following individual signals:
the first desired pressure signal PS1 which, in the second characteristic curve converter 10, as illustrated, for example, by the curve B' in FIG. 3, is determined as a function of the desired rotational engine speed value Nsoll and the input rotational speed signal NE;
the applied pressure PA which is stored in the control device 11; and
the pressure difference signal DPS which is determined by the control device 9 as a function of the input rotational speed signal NE from the desired rotational engine speed value Nsoll.

In step 17, it is tested whether:
the input rotational speed signal NE has reached a value of 97% of the desired rotational engine speed value Nsoll OR
the driving speed of the vehicle has reached or exceeded 5 km/h. When these conditions exist, the first phase 14 is exited.

The second phase 19 comprises a first step 20, in which the desired pressure signal PS is determined, as well as a subsequent step 21, in which it is inquired whether the second phase 19 may be exited.

In step 20, the desired pressure signal PS is determined as a summation signal from the following components:
the first desired pressure signal PS1, which is determined in the second characteristic curve converter 10, as illustrated in FIG. 3, as a function of the desired rotational engine speed value Nsoll and the input rotational speed signal NE;
the applied pressure PA which is stored in the control device 11; and
the pressure difference signal DPS which is determined by the control device 9 as a function of the slip in the clutch 2 represented by the rotational speed difference signal DN, according to a predetermined function (FIG. 4) in such a manner that the rotational speed difference signal DN is led toward zero, and the clutch 2 is therefore closed completely.

For the inquiry in step 21, it is tested whether the value of the rotational speed difference signal DN is below 3% and, if this is the case, the second phase 19 is exited.

The power range comprises step 23 in which the desired pressure signal PS is determined in the control device 9, for example, from a table by means of the input values throttle valve signal ALPHA and input rotational speed signal NE.

In addition, a recognition of a sudden power demand 24, a coasting monitoring 25 and a stalling protection 26 are provided as monitoring functions. The recognition of a sudden power demand 24 consists of the test whether the throttle valve signal ALPHA is significantly increased (by 30%) within a short time period (0.5 sec.) AND
the value of the throttle valve signal ALPHA after the increase is high (is above 50%) AND
a driving speed of the vehicle is still slow (30 km/h are not exceeded).

The recognition of a sudden power demand 24 is in each case provided from step 20 and step 23. When the necessary requirements are met, a jump to step 15 and therefore into the first phase 14 will therefore take place from the second phase 19 as well as from the power range 23.

The coasting monitoring 25 follows step 20 and first tests in a step 27 whether there is coasting. If this is so, it is further tested in step 28 whether the brake of the vehicle is actuated. If this is not the case, a branching takes place into the power range 23. However, when the brake is actuated, a branching takes place into a step 29 by means of which the clutch 2 is opened completely and from which a jump takes place to step 15 and thus into the first phase 14. As a result, it is possible in the former case to utilize the braking effect of the engine in the coasting operation because, as the result of the transition into the power range 23, the clutch 2 is closed completely, and in the latter case, it is possible in the case of a braking maneuver, to uncouple the driving engine 3 in order not to influence the braking operation.

Finally, the stalling protection 26 consists of the inquiry whether the input rotational speed signal NE falls below the idling rotational speed value of the driving engine 3 and, if this is the case, of a branching to step 15 and therefore into the first phase 14.

Generally, a restarting of phase 14, after a branching to step 15, is possible only when the conditions listed in step 15 have been met because otherwise step 16 is not reached and therefore no desired pressure signal PS is emitted and the clutch 2 remains open.

The stress computing unit 10 will also still be active in the power range. As illustrated above, here the stress value BINT is reduced slowly in the form of a cooling function because the rotational speed difference signal DN represents a rotational speed difference of less than 20 revolutions per minute. When the vehicle is now stopped and, as a result, the driving engine 3 arrives again in the starting range, a stress value BINT will also be available then which describes the actual thermal utilization of the clutch 2. A new starting operation, while the clutch 2 is still thermally stressed, will now be carried out in a manner that is adapted to the still existing stress reserves of the clutch 2; that is, particularly that the clutch 2 will be engaged faster and that, while the position of the power control element will be the same, the desired rotational speed to be adjusted will be lower.

In the event that the stress value BINT reaches the maximal stress value BINTmax, the clutch 2 will be opened up completely. The subsequent recovery phase of the clutch will be simulated by means of the above-described cooling function. As soon as the stress value BINT has again fallen under a warning value BINTwarn in the amount of approximately 90% of the maximal stress value BINTmax, the clutch 2 can be closed again and a starting will therefore be possible again. However, a new starting operation will be initiated only when a clear signal from the driver is present. For this purpose, it is provided that, after the falling below the warning value BINTwarn, the throttle valve signal ALPHA must at least once have reached the value corresponding to the idling position.

It is also possible to obtain the first desired pressure signal PS1, instead of by the characteristic curve B illustrated in FIG. 3, in the second characteristic curve converter 10 by means of a pilot control function. For this purpose, the second characteristic curve converter 10 determines a pilot control value A from the throttle valve signal ALPHA from which then, in a control device which is not shown, in conjunction with the input rotational speed signal NE, the first desired control signal PS1 is obtained. In this case, the control device determines the first desired pressure signal PS1 similarly to a centrifugal clutch proportionally by means of the pilot control value A and progressively by means of the input rotational speed signal NE. With an increasing input rotational speed, the progressive influence of the input rotational speed signal NE causes an engaging of the clutch which progresses faster and faster. The second characteristic curve converter 10 determines the pilot control value A by means of the input variables stress value BINT and throttle valve signal ALPHA from a multi-dimensional characteristic diagram. In the event that only the above-mentioned input quantities are used, the pilot control value A, however, is determined in an advantageous manner from two characteristic curves, specifically a first characteristic curve A(BINTmin, ALPHA) which represents the pilot control value A as a function of the throttle valve value ALPHA for the case of minimal stress BINT=BINTmin; that is, BINT is approximately zero, and in a second characteristic curve A (BINTmax, ALPHA) which indicates the same relationship for the maximal clutch stress BINT=BINTmax. In the case of the given throttle valve value ALPHA, two pilot control values A(BINTmax, ALPHA) and A(BINTmin, ALPHA) are determined from the characteristic curves, first from the above-mentioned characteristic curves, and the difference is formed of the above and is multiplied with the ratio of the actual stress value BINT to the maximal stress value BINTmax. A resulting pilot control difference value is added to the pilot control value A(BINTmin, ALPHA) for minimal clutch stress and is finally emitted as the pilot control value A. When, because of the slip occurring at the clutch 2, the stress value BINT rises, the pilot control value A and therefore also the first desired pressure signal PS1 will rise.

As the throttle valve signal ALPHA increases, the pilot control value A will first rise in order to then fall again. As a result, it is achieved that, above the summit of the characteristic pilot control value curve, the clutch 2 is closed less intensely and therefore slips more again and the starting can therefore take place at a higher rotational starting speed and a higher engine torque. When, in this portion of the characteristic pilot control value curve, the driver takes back the throttle valve position ALPHA in order to, for example, change the starting operation or even terminate it, the pilot control value A would rise rapidly and, as a result, the clutch 2 would be closed rapidly by the actuator 4. In order to avoid the jerk connected with this, by means of an A-return function, in the case of a taking-back of the throttle valve signal ALPHA and a simultaneous rising of the pilot control value A, this pilot control value will be held constant as long as the throttle valve signal ALPHA changes. When the throttle valve signal ALPHA is stable again within predetermined limits, the pilot control value A is increased again slowly as a function of the time until the actual pilot control value A again reaches the pilot control value A=f(BINT, ALPHA) taken from this characteristic curve and this function is concluded.

It is understood that, for the individual described control devices, all known control algorithms can basically be used, including fuzzy logic. For a selection of a special control algorithm, the detailed marginal conditions of the control device must then be taken into account.

For increasing the operating comfort and the operational reliability of a vehicle equipped with the control arrangement according to the invention, the following functions are additionally provided in it which, as a rule may be carried out by the control arrangement 11.

In order to draw the driver's attention to the exhaustion of the stress reserves of the clutch 2, an acoustic warning function is provided. This warning function will be activated when the stress value BINT has reached or exceeded the warning value BINTwarn. If this is so, a periodic warning sound is generated whose repetition frequency continues to rise with an increasing stress value BINT. When this stress value BINT reaches the maximal stress value BINTmax, a continuous warning sound is generated in parallel to the opening of the clutch 2 and is maintained until the stress value BINT has fallen again below the warning value BINTwarn. The discontinuing of the continuous warning sound indicates at the same time that the clutch 2 can now be closed again and a starting is therefore possible again.

As described above, the clutch 2 will definitely be opened up when the stress value BINT has reached or exceeded the limit value BINTmax. In this case, the driver has no influence on the clutch 2 so that the vehicle is partially removed from the driver's influence. Since the resulting vehicle behavior, even when the driver was warned acoustically by the above-described warning function, is not always predictable for the driver and, on the other hand, it is not ensured that the driver will react appropriately and in a manner that is predictable for other traffic participants, a holding function is provided when the clutch 2 opens on the basis of the stress value BINT. This holding function automatically actuates devices of the vehicle which prevent the vehicle from moving. In the embodiment, these are the braking devices of the vehicle which are actuated in conjunction with an automatic braking device (antilocking system) provided in the vehicle. In the same manner, it is possible to control, for example, a parking position or similar devices.

The holding function will be terminated when, because of the falling stress value BINT, the clutch 2 can be closed again and the driver actively gives gas.

Since the operating elements of the clutch 2 and the actuator 4 exhibit no constant effect during the whole operating period, but their effect changes depending on the operating condition and the wear, in an additional function for the applied pressure recognition, the applied pressure PA is determined repeatedly under specified conditions and is stored also beyond the stoppage of the vehicle or a parking of the vehicle. The applied pressure recognition attempts to determine the applied pressure PA in such a manner that the clutch 2 is operated close to the slip point. Thus the clutch 2 can grip immediately during the starting without the requirement of first having to pass through a disturbing idling path.

The applied pressure PA is determined under the following conditions:
the brake of the vehicle is actuated; AND
the throttle valve signal ALPHA is approximately zero; AND
the driving speed of the vehicle is approximately zero; AND
the input rotational speed signal NE is lower than the given limit value NEmin which is situated slightly above the idling rotational speed of the driving engine 3; AND
the starting ratio OR the reverse gear is engaged in a transmission of the vehicle.

When these conditions exist, the control arrangement 11 first emits a second desired pressure signal PS2 which is so far below the previously stored applied pressure PA, that the clutch 2 is opened up securely. In the exemplary embodiment, this is implemented by the use of a predetermined value for the applied pressure PA. With the same effect, it is also possible to, for example, divide the last-stored applied pressure PA in half or to reduce the last-stored applied pressure PA by a fixed amount. Subsequently, the second desired pressure signal PS2 is increased in small steps. After each increase, a waiting period is provided in order to await the reaction of the clutch 2 and therefore of the input rotational speed signal NE. When the increase of the actual input rotational speed signal value NE with respect to the input rotational speed signal value NE existing at the beginning of the applied pressure recognition, which is stored intermediately, is below a predetermined threshold, the desired pressure signal will be increased again. This will be continued until the input rotational speed signal NE has decreased by at least a predetermined amount. The second desired pressure signal PS2 is reduced by a small amount, is stored intermediately as a new applied pressure PA, and it is tested whether the input rotational speed signal NE returns to the range of the intermediately stored rotational speed which existed at the beginning of the applied pressure recognition. If this is so, the just determined new applied pressure PA is emitted again as a second desired pressure signal PS2 and is stored in a final manner. In the case of idling-rotational-speed-controlled systems, the rotational speed drop is replaced by the monitoring of a rise of the injection periods by a predetermined extent.

The determination of the applied pressure PA will be terminated as soon as one of the above-mentioned conditions is violated. If the applied pressure recognition could be concluded successfully, it will not be repeated before the starting range is left and is reached again.

In order to avoid an unnecessary stressing of the clutch, which is unavoidable when the clutch 2 is operated close to the slip point, while the vehicle is standing, a standing uncoupling function is provided which, in the case of certain prerequisites, reduces the second desired pressure signal PS2 to the actuator 4 by a predetermined amount. These conditions are:

The brake of the vehicle is actuated; AND the throttle valve signal ALPHA is approximately zero; AND the driving speed of the vehicle is almost zero (v<3 km/h); AND the starting ratio OR the reverse gear is engaged in a transmission of the vehicle.

By means of this condition, it is ensured that the function will be carried out only when the vehicle is standing and no starting operation is to be expected within a short period of time. The actuator 4 will be controlled by means of the reduced second desired pressure signal PS2 as long as the following conditions are met:

The brake of the vehicle is actuated; AND the throttle valve signal ALPHA is approximately zero.

In order to generally and particularly in the case of a discontinuing of the standing uncoupling function described in the preceding paragraph, ensure a fast response of the clutch 2, in a function for the application of the clutch 2, under certain conditions, the actuator 4 is acted upon by a brief control pulse Si. In this exemplary embodiment, this control pulse Si is a brief increase of the second desired pressure signal PS2 by a predetermined value, in which case the size and the length of this pulse are set as a function of operating quantities of the actuator 4 and of the clutch 2 in such a manner that an above-described operation of the clutch 2 close to the slip point is reliably reached. Preferably, the desired values for the pulse duration and the pulse intensity are therefore stored in a characteristic diagram as a function of the operating quantities.

The control pulse Si is triggered under the following conditions:

The brake of the vehicle was released and had previously been actuated at least for a predetermined time period—in the embodiment for approximately 1.5 seconds; AND the driving speed of the vehicle is approximately zero; AND the input rotational speed signal NE is below a predetermined value NEmin, in which case this value is selected to be small, preferably slightly above an idling rotational speed value of the driving engine 3; AND at least a predetermined time period has passed since a preceding control pulse Si (in an exemplary embodiment approximately 1.5 seconds). As a rule, the control pulse Si will follow the previously described standing uncoupling function. This will not take place only when the standing uncoupling function was exited because the conditions were violated by way of the engaged transmission gear or when, during the exiting of the standing uncoupling, the rotational speed has already risen above the predetermined value.

On gradients or under similar conditions in different situations, the vehicle may start to roll while the brake is released without any opening-up of the throttle valve of the driving engine 3. Since, in this case, the input rotational speed signal NE and the throttle valve signal ALPHA are approximately zero, the vehicle may start to roll without any closing of the clutch 2 and without any participation of the driving engine 3 as a braking element. In order to prevent this so-called free wheeling, it is provided in a free wheeling function that, when certain conditions exist, the actuator 4 will be controlled in the sense of a closing of the clutch 2.

Here, the following conditions will apply with respect to the triggering of this function:

The throttle valve signal ALPHA is approximately zero; AND the input rotational speed signal is lower than a predetermined limit value NEmin situated slightly above the idling rotational speed of the driving engine 3; AND the output rotational speed signal NA is higher than the input rotational speed signal NE; AND in the transmission connected behind the clutch 2, the starting ratio is engaged, for example, the first transmission gear or the reverse gear; AND no other additional function is active.

The function is terminated when the throttle valve signal ALPHA is larger than approximately zero; OR the output rotational speed signal NA is smaller than the limit value NEmin; OR a different gear than the above-mentioned gears of the transmission is engaged.

The starting control described in the embodiment is designed for a normal starting range. Furthermore, the above-described kick-down range illustrated in FIG. 4 permits special starts with increased power. Special starts at a higher rotational engine speed for the utilization of the flywheel effect of the driving engine 3 in the sense of a short-term magnification of the driving torque require a separate starting strategy, not least because of safety reasons. While, during normal starts, the input rotational speed signal NE was caused to follow the characteristic curve B illustrated in FIG. 3, this characteristic curve for the special starting function will at first have a clearly flatter course and in the range of the desired rotational speed Nsoll, will have a course that is clearly steeper still on the other side of the characteristic curve E. Correspondingly, the parameters of the control device 9 for the first phase of the starting operation are now designed in such a manner that the engagement of the control device 9 takes place later, but then at a higher desired pressure difference signal DS. As a result, the driving engine 3 can at first rev almost freely. This is particularly significant in the case of turbo-charged engines. If the rotational engine speed, therefore the input rotational speed signal NE, reaches the proximity of the desired rotational speed Nsoll, the control device 9 will intervene in that the clutch 2 is closed rapidly and therefore in a comparatively hard manner. By means of this measure, the flywheel effect of the rotating masses of the driving engine 3 is utilized.

For entering the special starting function, it is important that this function can be triggered only by a conscious signal of the driver. Such a signal may, for example, take place by a stalling of the vehicle while the throttle valve signal ALPHA is high, or by an actuating of a switch arranged on a transmission shift lever or a hand brake operating element.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Process for controlling a starting of a motor vehicle drive that has a driving engine and a starting device, comprising the steps of:

using quantities such as a position of a power control element of the driving engine, an input rotational speed of the starting device, and an output rotational speed of the starting device; and carrying out in two phases a starting operation for the motor vehicle using a control arrangement, said phases including a first phase forming a first command variable signal input to a first control unit supplying a first actuating signal for controlling an actuator for the starting device in order to vary the input and output rotational speeds, in which during said first phase the input rotational speed generated from an input rotational speed generator coupled to the starting device is led to a desired rotational speed determined by a first characteristic curve converter, and a subsequent second phase forming a second command variable signal input to said first control unit supplying the first actuating signal for controlling the actuator for the starting device, in which during said second phase a rotational speed difference signal formed in a difference forming unit from the difference between the input rotational speed and the output rotational speed is led along a desired course to a zero value.

2. Process according to claim 1, wherein the first phase begins when the starting device is not completely closed and the position of the power control element is below a limit value, and wherein said first phase includes: determining the desired rotational speed as a function of the position of the power control element; determining a desired curve of the first actuating signal for the actuator of the starting device such that, in the actual position of the power control element, the desired rotational speed is reached; and subsequently determining the first actuating signal as a function of the position of the power control element and the input rotational speed signal according to the desired curve, and setting said first actuating signal such that the input rotational speed signal approaches the desired rotational speed.

3. Process according to claim 2, further comprising determining the desired rotational speed as a function of the position of the power control element, a time variation of the position of the power control element, and a signal describing a driving style of a driver.

4. Process according to claim 2, wherein an actuating device is controlled as a function of a summation of a system-dependent system actuating signal, the first actuating signal and a desired pressure difference signal.

5. Process according to claim 2, further comprising a special start function, upon a special demand signal by the driver of the vehicle, in which a special desired curve of the first actuating signal is selected which, in comparison to the normally used desired curves, first provides a clearly lower rise of the first actuating signal and, in a proximity of the desired rotational speed, then provides a very rapid rise of the first actuating signal above the input rotational speed signal.

6. Process according to claim 5, wherein a special demand signal is at least one of an actuating of a brake of the vehicle, while the throttle valve signal is high at the same time, or an actuating of a separately arranged switch.

7. Process according to claim 1, wherein the second phase begins when the difference between the input rotational speed signal and the desired rotational speed is below a limit value or a predetermined minimum driving speed has been reached, the second phase including: determining a desired pressure difference signal such that a desired change of a rotational speed difference signal, as a function of the rotational speed difference signal is led along a desired curve toward a zero value, the desired curve having falling desired changes when the rotational speed difference signal falls.

8. Process according to claim 1, further comprising the steps of: sensing torque transmitted by the starting device, determining a stress value of the starting device from the input rotational speed, the output rotational speed and the torque; and determining the desired rotational speed as a function of the position of the power control element and the stress value.

9. Process according to claim 8, further comprising the steps of: determining the stress value as a product of the torque and the difference between the input rotational speed signal and the output rotational speed signal when the rotational speed difference exceeds a limit value and otherwise determining the stress value by a reduction according to a predetermined function.

10. Process according to claim 9, further comprising, as a result of a warning function, generating a warning signal as soon as the stress value has reached a predetermined proportion of a maximal stress value, the generated warning signal being modulated by the size of the stress value, and opening up the starting device 2 as soon as the stress value reaches or exceeds the maximal stress value.

11. Process according to claim 10, further comprising activating a holding device by a holding function, said holding device preventing the vehicle from rolling, as soon as the starting device is opened up because of a reaching or exceeding of the maximal stress value and deactivating the holding device as soon as the stress value falls below the maximal stress value and the position of the power control element allows the conclusion that the power control element is actuated.

12. Process according to claim 1, further comprising a function for the applied pressure recognition for determining the system actuating signal, including controlling the actuator to close the starting device when: a brake is actuated; and the position of the power control element indicates an unactuated power control element; and a driving speed is approximately zero; and the input rotational speed signal is below a predetermined low threshold; and a starting ratio is selected in a torque converter connected behind the starting device;

first reducing a second actuating signal for an actuator of the starting device to such an extent that the starting device will be opened up securely, then increasing the second actuating signal step-by-step until the input rotational speed signal has fallen by a predetermined value or a device for stabilizing the input rotational speed signal reports an adjusting because of a drop of the input rotational speed signal, and subsequently storing the second actuating signal of the actuator, which exists at this point in time and is reduced by a predetermined amount, as the system actuating signal.

13. Process according to claim 12, further comprising entering a waiting period after each step-by-step increase of the second actuating signal, and discontinuing controlling of the actuating device as soon as one of the initially mentioned conditions is no longer met and, after the storage of the second actuating signal which is reduced by a predetermined amount, emitting the second actuating signal to the actuator and, only if subsequently, the original input rotational speed signal is set or the device for the stabilization of the input rotational speed signal reports no more adjusting, storing the second actuating signal as the system actuating signal.

14. Process according to claim 1, further comprising a standing uncoupling function in which a second actuating signal emitted to an actuator is reduced by a predetermined amount, when: a brake of the vehicle was active for a predetermined time period and was then released; and a driving speed is approximately zero; and a starting ratio is selected in a torque converter connected behind the starting device.

15. Process according to claim 1, further comprising a function for applying the starting device, in which a control pulse is emitted to an actuator when: a brake of the vehicle is released; and the output rotational speed signal is low; and the input rotational speed signal is below a predetermined low value; and a predetermined time period has elapsed from the preceding emission of the control pulse; the control pulse being dimensioned such that idling paths are overcome which exist in the starting device.

16. Process according to claim 1, further comprising a free wheeling function for preventing rolling away of the motor vehicle, in which an actuator is controlled to close the starting device, when the position of the power control element is approximately zero, and a starting ratio is selected in a torque converter connected behind the starting device, and the input rotational speed signal is no higher than slightly above the idling rotational speed of the driving engine, and the output rotational speed signal is higher than the input rotational speed signal evaluated by the set ratio.

17. A control arrangement for a driving engine and a starting device connected behind said driving engine, comprising:
 a first generator for outputting a position of a power control element of the driving engine;
 a second generator for outputting an input rotational speed signal of the starting device;
 a third generator for outputting an output rotational speed signal of the starting device;
 a difference forming device coupled to the second and third generators for determining a rotational speed difference signal as a difference between the input rotational speed signal and the output rotational speed signal;
 a first characteristic curve converter coupled to the first generator for determining a desired rotational speed as a function of the signal of the first generator;
 a first control device which, in a first phase of the starting operation, generates a difference actuating signal in such a manner that the input rotational speed signal is led to the desired rotational speed signal and in a second phase, generates the difference actuating signal in such a manner that the rotational speed difference signal changes at a rate which is a function of the size of the rotational speed difference signal;
 a second characteristic curve converter coupled to the first generator for determining a first actuating signal as a function of the position of the power control element, the input rotational speed signal and the desired rotational speed;
 a second control device for determining a second actuating signal from the first actuating signal and an application actuating signal; and
 an actuating device which controls the starting device so as to vary the input and output rotational speed signals, said actuating device controlling the starting device according to the sum of the second actuating signal and the difference actuating signal.

18. Arrangement according to claim 17, wherein the second characteristic curve converter determines the desired rotational speed as a function of the position of the power control element, the change of this signal and a signal describing the driver's driving style.

* * * * *